INVENTOR.
ROBERT L. JAMES
BY Herbert L. Davis
ATTORNEY

3,259,825
CONTROL CIRCUIT FOR A LOW-NOISE SILICON CONTROLLED RECTIFIER SERVO DRIVE

Robert L. James, Bloomfield, N.J., assignor to The Bendix Corporation, Teterboro, N.J., a corporation of Delaware
Filed July 17, 1963, Ser. No. 295,648
13 Claims. (Cl. 318—341)

This invention relates to a control circuit for a low-noise silicon controlled rectifier servo drive and more particularly to electrical control systems adapted to operate an electric servomotor.

An object of the invention is to provide a novel silicon control rectifier servo drive which generates considerably less radio frequency interference than conventional silicon control rectifier servo drives and without utilizing radio frequency line filters, or shielding in a control system in which high transient voltages and currents hertofore associated with the conventional silicon control rectifier servo drive has been virtually eliminated.

Another object of the invention is to provide a novel control circuit in which the firing of the silicon control rectifier is always effected at the start of the conduction half cycle of the control rectifier so as to prevent fast rising high amplitude anode currents and voltages from being applied through the rectifier and which would otherwise produce radio frequency interference noise.

Another object of the invention is to provide a novel control circuit for effectively firing a silicon control rectifier in the aforenoted manner and for proportionally controlling the power output of the silicon controlled rectifier to the load.

Another object of the invention is to provide a novel circuit control arrangement for proportionally controlling power output to a load by controlling the rate of half cycle pulses to the load and by controlling the number of successive half cycle pulses of power delivered to the load at a given time.

These and other advantages are realized in the disclosed servo drive control system by causing the silicon controlled rectifier to always fire for a full half cycle, and by realizing a proportional control of the output by controlling the number of half cycles that the silicon controlled rectifier is conducting at any time so that with a constant energizing alternating current (or other anode supply frequency) of for example 400 cycles, the silicon controlled rectifier will not fire each half cycle that its anode is positive, but will have some integral number of nonconductive positive half cycles in a given time, the number being controlled by the input signal to the servo drive. Thus, in effect, the conduction duty cycle of the silicon controlled rectifier is changed by the input signal so that the output of the servo drive is proportionally controlled.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figures 1, 2:
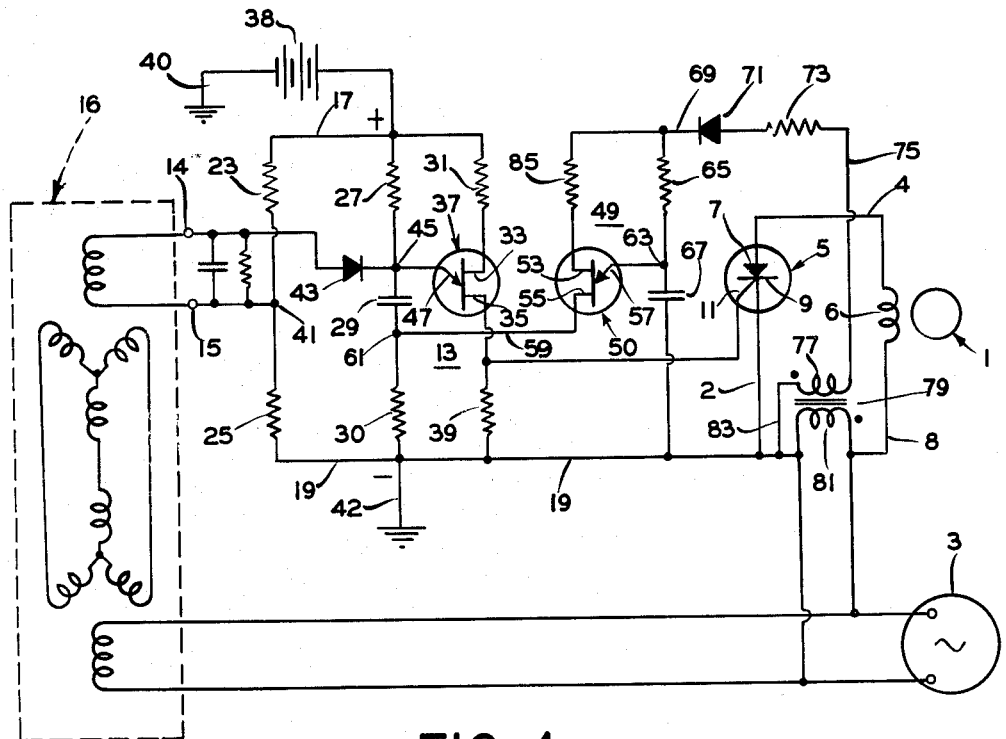
FIGURE 1 is a schematic wiring diagram of an electric servomotor control circuit constructed according to the present invention.
FIGURE 2 is a graphical illustration showing that the firing of the duty cycle of the silicon controlled rectifier may be varied by changing the rate of the anode conductive half cycle and further illustrating graphically the relationship of a generated pulse to the start of the conductive half cycle for the silicon controlled rectifier.

Referring to the drawing and more particularly to FIGURE 1, there is shown therein a novel control circuit constructed according to the present invention and adapted particularly to effect proportional operation of a direct current motor 1, by an alternating current power source 3 in response to a control signal.

A silicon controlled rectifier 5 is connected by conductors 2 and 4 in series with the source 3 and motor 1 and controls energization of the winding 6 of the motor 1 connected by a conductor 8 to the source 3. The rectifier 5 operates similarly to a thyratron and passes current from anode 7 to cathode 9 after a gating pulse is applied to a gating terminal 11 and while the anode supply voltage is positive. The gating pulses for silicon controlled rectifier 5 are provided by novel pulse forming circuit 13 which may be of a type such as disclosed and claimed in U.S. Patent No. 3,192,462, granted June 29, 1965, to Robert L. James, the inventor of the present invention, and assigned to The Bendix Corporation, assignee of the present invention.

In the pulse forming circuit 13, the time of occurrence of the pulse corresponds to the amplitude of a control signal applied to inputs 14 and 15, and which control signal, as shown in FIGURE 1, may be supplied by a conventional synchro control system 16 energized by the alternating current power supply 3.

The pulse forming circuit 13 comprises a pair of parallel leads 17 and 19 connecting in parallel a pair of series connected pedestal resistors 23 and 25, series connected resistor 27, capacitor 29, and resistor 30, and series connected resistor 31, bases 33 and 35 of unijunction transistor 37 and resistor 39. A suitable source of direct current such as a battery 38 has a positive terminal connected to the conductor 17 and its negative conductor grounded at 40 so as to in turn be applied to the grounded terminal 42 of the lead 19.

An alternating current signal may be applied by the synchro control system 16 to the inputs 14 and 15 of the pulse forming circuit 13 so as to control the motor 1.

The input 15 is connected to a point 41 between resistors 23 and 25 while the input 14 is connected through a diode 43 to a point 45 between resistor 27 and capacitor 29. An emitter 47 of the unijunction transistor 37 is connected to the point 45.

Bases 33 and 35 of the unijunction transistor 37 are biased by the battery 38 so as to normally maintain the path from the emitter 47 to base 35 open in the absence of signal voltages being applied across input terminals 14 and 15.

Upon a signal voltage being applied across input terminals 14 and 15 by the synchro control system 16 a charge builds up on capacitor 29 being applied through diode 43 and pedestal resistor 25 and resistor 30, in addition to the charge applied to the capacitor 29 by the biasing battery 38, until the capacitor 29 is charged to the firing level of the transistor 37. The time required for the capacitor 29 to be charged to the firing level of the transistor 37 will vary with the amplitude of the signal voltage applied across the input terminals 14 and 15 by the synchro control system 16.

Upon the transistor 37 firing, the capacitor 29 then discharges through transistor 37 and a gating pulse is applied to the gating terminal 11 of the silicon controlled rectifier 5 whereupon there is applied to the motor 1 an electrical pulse during the time interval of its half cycle of positive anode voltage.

Thus, the silicon controlled rectifier 5 receives a gating pulse which occurs at the start of the positive half cycle of the anode voltage for energizing the motor 1, and the number of half cycles having a gating pulse is a function of the amplitude of the signal at input terminals 14 and 15. Thus, the number per second of half cycles in which the electric motor 1 is pulsed is determined by the amplitude of the input signal.

Thus, there is provided a diode sampler circuit 13 which samples the sine wave input signal applied across input terminals 14 and 15 producing a change in the rider voltage used to fire the unijunction transistor 37. The sampler circuit 13 may be of a type such as described and claimed in the U.S. Patent No. 3,192,462.

In the present invention, there is superimposed on this rider voltage a train of saw tooth pulses which are applied across the resistor 30 connected between the capacitor 29 and the lead 19, and which pulses are derived from a pulse generator circuit 49 including unijunction transistor 50. These pulses have a repetition rate equal to the anode supply frequency of the source 3 and are in synchronism with the start of each anode (positive going) half cycle of the alternating current for energizing the motor 1.

When the charge applied to the capacitor 29 by the rider voltage plus one of the pulses applied across the resistor 30 reaches the unijunction transistor 37 firing threshold, the unijunction transistor 37 fires and produces an output gating pulse applied to the gating terminal 11 of the silicon controlled rectifier 5 occuring at the start of the positive half cycle of the anode voltage for energizing the winding 6 of motor 1. This fires the silicon controlled rectifier 5 at the start of the half cycle of said anode voltage and turning it on when the anode voltage and current will be very low in the anode circuit of the motor 1.

After the unijunction transistor 37 has finished discharging capacitor 29, the unijunction transistor 37 returns to its proper state allowing the capacitor 29 to again charge up sufficiently to fire the unijunction transistor 37 (again at the start of a positive anode half cycle) but at a rate depending on the sampled value of the signal applied across input terminals 14 and 15.

Thus the amplitude of the input signal controls the rate of anode half cycle pulses delivered to the control motor 1. The circuit of FIGURE 1 is adjusted so that maximum signal input causes the silicon controlled rectifier 5 to fire every time its anode goes positive. A firing duty cycle of the silicon controlled rectifier 5 may be changed not only by changing the rate of anode conduction half cycles, as shown graphically in FIGURE 2, but also by changing the number of successive anode half cycle firings in a given time.

This may be done by any type of gate circuit designed to pass a desired number of successive firing pulses to the silicon controlled rectifier or by synchronizing and adjusting the circuit of FIGURE 1.

In the circuit of FIGURE 1, the pulse generator 50 has bases 53 and 55 and an emitter 57. The base 55 is connected by a conductor 59 to a point 61 between the capacitor 29 and the resistor 30 while the emitter 57 is connected at a point 63 between a resistor 65 and a capacitor 67 serially connected between the conductor 19 and a conductor 69.

The conductor 69 leads through a rectifier 71, resistor 73, and a conductor 75 to a secondary winding 77 of a transformer 79 having a primary winding 81 connected across the output terminals of the source of alternating current 3. The secondary winding 77 is connected by a conductor 83 to the lead 19. A biasing resistor 85 is connected between the base 53 and the lead 69. The secondary winding 77 of the transformer 79 is so arranged in relation to the primary winding 81 that the alternating current induced therein is reversed in phase to that of the alternating current applied to the primary winding 81 from the alternating current source 3.

Through the aforenoted pulse generator circuit 49 generated saw tooth pulses in synchronism with the alternating current from source 3 are applied through the unijunction transistor 50 and across the resistor 30 in a sense to add to the charge applied across the capacitor 29 so as to cause the silicon controlled rectifier 5 to fire at a time when the anode voltage applied to the silicon controlled rectifier 5 by the alternating current source 3 is at a substantially zero value so that no radio frequency noise is generated in the control circuit for the motor 1.

The generated saw tooth pulses are indicated graphically in FIGURE 2 by the letter A while the conducting half cycle pulses of energizing current for the motor 1 are indicated by the letter B and the relationship of the one to the other under relatively high and low amplitude signal conditions has been shown graphically in FIGURE 2.

It will be seen then that the closing of the motor control circuit through the silicon controlled rectifier 5, is effected at a rate proportional to the amplitude of the signal applied across the input terminals 14 and 15 so as to thereby vary the energization of the motor 1 in accordance with such input signals.

Thus, there is provided novel means for always firing the silicon controlled rectifier 5 at the start of its conduction half cycle so as to prevent fast rising high amplitude currents and voltages in the energization of the motor 1 which would otherwise produce radio frequency interference noises. There is further provided a control circuitry for firing the silicon controlled rectifier 5 in the aforenoted manner and for proportionally controlling the power output from the silicon controlled rectifier 5 to the motor 1 and a novel circuit means 13 of proportionally controlling the power output to the motor 1 by controlling the rate of half cycle pulses to the motor 1 as implemented by the pulse generating circuit 49 and by controlling the number of half cycle pulses of power delivered to the load or motor 1 in a given time.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A circuit for providing a proportional output from an alternating current power source in accordance with a variable amplitude electrical signal, comprising a controlled rectifier connected to the source, a first pulse forming circuit connected to the controlled rectifier for providing pulses for rendering the controlled rectifier selectively conductive to provide a proportional output in accordance with the amplitude of the electrical signal, a second pulse forming circuit energized by the alternating current power source for operatively controlling the first pulse forming circuit so as to cause the first pulse forming circuit to render the controlled rectifier conductive in synchronism with the alternating current power source.

2. A circuit for providing a proportional output from an alternating current power source in accordance with a signal, comprising a controlled rectifier connected to the source, a first pulse forming circuit connected to the controlled rectifier for providing pulses in each half cycle of positive anode supply voltage of the controlled rectifier at a time corresponding to the amplitude of the signal for rendering the controlled rectifier selectively conductive to provide a proportional output in accordance with the signal, a second pulse forming circuit operatively connected to the first pulse forming circuit so as to cause the first pulse forming circuit to control the rectifier so as to render the rectifier conductive at the start of each of said half cycles at all output power levels so as to prevent a steep rise in the current of said half cycles.

3. A circuit for providing a proportional output from an alternating current power source in accordance with a signal,
comprising a controlled rectifier connected to the source and having a gating terminal,
and a first pulse forming circuit including a unijunction transistor connected to the gating terminal of the controlled rectifier for providing pulses to the controlled rectifier in each half cycle of anode supply voltage at a time corresponding to the amplitude of the signal for rendering the controlled rectifier conductive during the remainder of the half cycle to provide a proportional output in accordance with the signal,
means for generating saw tooth pulses in synchronism with said alternating current power source,
means for controlling the first pulse forming circuit,
and means for operatively connecting the saw tooth pulses produced by said generating means to said control means for the first pulse forming circuit so as to cause said first pusle forming circuit to render the controlled rectifier conductive at all output power levels when the half cycle of alternating current is at a substantially zero value.

4. A circuit for proportionally controlling the operation of an electric motor from an alternating current power source in accordance with a signal,
comprising a controlled rectifier connected to the motor and source,
a first pulse forming circuit connected to the controlled rectifier for providing pulses in accordance with the signal,
a second pulse forming circuit for providing pulses in synchronism with the alternating current from said source,
and means for applying the pulses from said first and second pulse forming circuits in synchronized relation to said controlled rectifier for rendering the controlled rectifier conductive at the start of each effective half cycle of said alternating current for all power levels so as to energize the motor from said source in accordance with said signal and in synchronism with the alternating current from said source.

5. A circuit for proportionally controlling the operation of an electric motor from an alternating current power source in accordance with a signal,
comprising a controlled rectifier connected to the motor and source,
a pulse forming circuit connected to the controlled rectifier for providing pulses in each half cycle of positive anode supply voltage of the controlled rectifier at a time corresponding to the amplitude of the signal for rendering the controlled rectifier conductive during the remainder of the half cycle to energize the motor from said source in accordance with the signal,
pulse generating means operatively connected to said source of alternating current so as to provide saw tooth pulses in synchronism with said source,
means for controlling the pulse forming circuit,
and means operatively connecting the saw tooth pulse output of said pulse generating means to said control means for causing said pulse forming circuit to render the controlled rectifier conductive at the start of each half cycle of the positive anode supply voltage at all output power levels.

6. A circuit for proportionally controlling the operation of an electric motor from an alternating current power source in accordance with a signal,
comprising a controlled rectifier connected to the motor and source and having a gating terminal,
a pulse forming circuit including a unijunction transistor connected to the gating terminal of the controlled rectifier for providing pulses to the controlled rectifier in each half cycle of anode supply voltage at a time corresponding to the amplitude of the signal for rendering the controlled rectifier conductive during the remainder of the half cycle to energize the motor in accordance with the signal,
an auxiliary pulse generating means for controlling the operation of the unijunction transistor so as to cause the pulses provided thereby to be effective at the start of each half cycle of said anode supply voltage at all output power levels.

7. A circuit for proportionally controlling the operation of an electric motor from an alternating current power source in accordance with a signal,
comprising a controlled rectifier connected to the motor and source and having a gating terminal,
a pulse forming circuit including a unijunction transistor connected to the gating terminal,
a capacitor connected to the unijunction transistor and adapted to discharge through the unijunction transistor for providing pulses to the controlled rectifier for rendering the controlled rectifier conductive to energize the motor from said source in accordance with the signal,
a resistor serially connected with said capacitor,
means for generating pulses in synchronism with the alternating current from said source,
means for operatively connecting the pulses from said generating means across said resistor so as to act in additive relation with the discharge from said capacitor so as to apply said pulses to the controlled rectifier to render the same conductive when the energizing current from said source is at a substantially zero value at all output power levels.

8. A circuit for proportionally controlling the operation of an electric motor from an alternating current power source in accordance with a signal comprising
a controlled rectifier connected to the motor and source, and including a gating terminal,
a first pulse forming circuit including a unijunction transistor connected to the gating terminal,
a capacitor connected to the unijunction transistor and adapted to discharge through the unijunction transistor for providing pulses to the controlled rectifier for rendering the controlled rectifier selectively conductive of half cycles of alternating current from said source to variably energize the motor in accordance with the amplitude of said signal,
a resistor serially connected to the capacitor,
a second pulse forming circuit for applying a pulse across said resistor acting in additive relation to the discharge from said capacitor so as to cause said unijunction transistor to fire for providing said pulses to the controlled rectifier at the start of each of said half cycles of alternating current from said source at all output power levels.

9. A circuit for proportionally controlling the operation of an electric motor from an alternating current power source in accordance with a signal,
comprising a controlled rectifier connected to the motor and source and having a gating terminal,
a first pulse forming circuit including a unijunction transistor connected to the gating terminal,
a capacitor connected to the unijunction transistor and adapted to discharge through the unijunction transistor for providing pulses,
means for charging the capacitor in each half cycle of positive anode supply voltage of the controlled rectifier so that the capacitor discharges through the unijunction transistor for providing pulses to the controlled rectifier at a time corresponding to the amplitude of the signal for rendering the controlled rectifier conductive during the remainder of the half cycle to energize the motor in accordance with the signal, a resistor serially connected to said capacitor, a second pulse forming circuit energized from said alternating current power source for effecting saw tooth pulses in synchronism with the alternating current from said power source, and means operatively connecting said saw tooth pulses across said resistor so as to act in additive relation with the discharge from said capacitor so as to cause said unijunction transistor to fire for rendering the controlled rectifier conductive only at the start of said half cycle positive anode supply voltage at all output power levels.

10. A circuit for proportionally controlling the operation of an electric motor from an alternating current power source in accordance with a signal, comprising a controlled rectifier connected to the motor and source and having a gating terminal, a first pulse forming circuit including a unijunction transistor connected to the gating terminal, a capacitor connected to the unijunction transistor, means for charging the capacitor in accordance with the signal, means for discharging the capacitor through the unijunction transistor for providing pulses to the gating terminal of the controlled rectifier at a time corresponding to the amplitude of the signal for rendering the controlled rectifier selectively conductive of half cycles of positive anode supply voltage to energize the motor in accordance with the signal, a second pulse forming circuit energized from said source of alternating current and operating in synchronism therewith to provide saw tooth pulses, a resistor connected in series with said capacitor, and means applying said saw tooth pulses from said second pulse forming circuit across said resistor so as to act in additive relation with the discharge from said capacitor for causing the controlled rectifier to become conductive at the start of the selected half cycles of said positive anode supply voltage and when said supply voltage is at a substantially zero value at all output power levels.

11. A circuit for providing a proportional output from an alternating current power source in accordance with an electrical signal, comprising a controlled rectifier connected to the source and having a gating terminal, a first electrical pulse forming circuit including a unijunction transistor connected to the gating terminal, a capacitor connected to the unijunction transistor, means for electrically charging the capacitor in accordance with the electrical signal, means for directing an electrical discharge from the capacitor through the unijunction transistor so as to apply electrical pulses to the gating terminal of the controlled rectifier at a frequency varying with the amplitude of the electrical signal, the electrical pulses applied to the gating terminal rendering the controlled rectifier selectively conductive of half cycles of positive anode supply voltage from said source to provide an electrical output from the controlled rectifier proportional to the electrical signal, a second electrical pulse forming circuit operated by said source of alternating current for effecting saw tooth electrical pulses in synchronism with the alternating current from said source, means for applying said saw tooth electrical pulses in additive relation with the electrical discharge from said capacitor for rendering said capacitor effective to fire said unijunction transistor to electrically discharge the capacitor therethrough at a time corresponding to the start of each of said selectively conducted half cycles.

12. The combination comprising a source of alternating current, means for supplying electrical signals of varying amplitude, first means for generating electrical pulses having a frequency proportional to the amplitude of the electrical signals supplied by said signal means, second means for generating electrical pulses in synchronism with the alternating current supplied by said source, said first pulse generating means including means for storing electrical signals provided by said signal supply means, means for discharging the stored electrical signal, said discharging means including means summing the electrical pulses generated by said second means with the electrical discharges from said storing means, a motor including an operating circuit energized from said alternating current source, said last-mentioned circuit including means for controlling the energizing current for said motor, and said control means being operative by said discharging means to vary the frequency of the alternating current applied to the motor through the last-mentioned circuit in proportion to the amplitude of the signal and in synchronism with the alternat-current from said source.

13. The combination comprising a controlled rectifier connected to a source of alternating current, first means providing electrical pulses in accordance with the amplitude of an electrical signal, second means for providing electrical pulses in synchronism with the alternating current from said source, means for summing the pulses from said first and second means, and means for operatively connecting said summing means to the controlled rectifier to render the rectifier selectively conductive of half cycles of the alternating current from said source so as to provide a pulsating electrical output having a frequency varying with the amplitude of the electrical signal and in synchronism with the alternating current from said source.

References Cited by the Examiner

UNITED STATES PATENTS

| | | | |
|---|---|---|---|
| 3,095,534 | 6/1963 | Cockrell | 318—331 |
| 3,146,392 | 8/1964 | Sylvan | 323—22 |
| 3,152,451 | 10/1964 | Downs | 307—88.5 X |
| 3,183,372 | 5/1965 | Chin | 307—88.5 |
| 3,192,466 | 6/1965 | Sylvan et al. | 307—88.5 X |

OTHER REFERENCES

G. E. SCR Manual, 1st ed., Auburn, New York, 1960, pp. 54–56.

Publication: G. E. SCR Manual, 2nd edition, Auburn, New York, TK–2798 G4g, 1961, pp. 115–117, 342.

ORIS L. RADER, *Primary Examiner.*

S. GORDON, J. C. BERENZWEIG,
*Assistant Examiners.*